(12) United States Patent
Chen (10) Patent No.: US 7,982,807 B2
(45) Date of Patent: Jul. 19, 2011

(54) METHOD FOR PROCESSING A BACKLIGHT IMAGE AND DEVICE THEREOF

(75) Inventor: Yu-Cheng Chen, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 1126 days.

(21) Appl. No.: 11/736,586

(22) Filed: Apr. 18, 2007

(65) Prior Publication Data

US 2008/0074510 A1 Mar. 27, 2008

(30) Foreign Application Priority Data

Sep. 22, 2006 (TW) .............................. 95135106 A (51) Int. Cl.
*H04N 9/64* (2006.01)
(52) U.S. Cl. ...................................................... 348/687
(58) Field of Classification Search .................. 348/687, 348/688, 673, 650, 651, 672; 345/63, 87; 382/167–169
See application file for complete search history.

(56) References Cited

U.S. PATENT DOCUMENTS

| | | | | | |
|---|---|---|---|---|---|
| 5,963,665 | A | * | 10/1999 | Kim et al. | 382/169 |
| 5,974,113 | A | * | 10/1999 | Bruijns et al. | 378/98.7 |
| 6,507,372 | B1 | * | 1/2003 | Kim | 348/630 |
| 7,428,021 | B2 | * | 9/2008 | Fukuda | 348/650 |
| 7,454,137 | B2 | * | 11/2008 | Lee et al. | 396/282 |
| 2006/0267871 | A1 | * | 11/2006 | Seong et al. | 345/63 |
| 2009/0174636 | A1 | * | 7/2009 | Kohashikawa et al. | 345/87 |

OTHER PUBLICATIONS

Chiun-Li Chin, et al. "Detection and Compensation Algorithm for Backlight Images With Fuzzy Logic and Adaptive Compensation Curve", International Journal of Pattern Recognition and Artificial Intelligence, vol. 19, No. 8 (2005).

* cited by examiner

*Primary Examiner* — Paulos M Natnael (57) ABSTRACT

A method for processing an image includes inputting an image, generating a first mean luminance value and a second mean luminance value according to a plurality of pixels within a first luminance interval and a second luminance interval of the image, generating a first luminance threshold according to the first mean luminance value, setting a compensation parameter, generating a first compensation luminance value according to the first mean luminance value and the compensation parameter, generating a second compensation luminance value according to the first luminance threshold, the first mean luminance value, the second mean luminance value, and the compensation parameter, and adjusting luminance values of pixels within the a smaller compensation luminance value and a greater compensation luminance value according to the smaller compensation value and a comparison between the first compensation luminance value and the second compensation luminance value.

20 Claims, 5 Drawing Sheets

METHOD FOR PROCESSING A BACKLIGHT IMAGE AND DEVICE THEREOF

BACKGROUND OF THE INVENTION

1. Field of the Invention

The present invention relates to a method for processing a backlight image and a device thereof, and more specifically, to a method for compensating a darker region of a backlight image and a device thereof.

2. Description of the Prior Art

With the development of technology, analog tools are gradually replaced by digital products. Digital camera is the most representative example. Compared with a traditional camera, images are digitalized into digital signals by the digital camera. Then the digital signals are saved into a file form in a memory device. A user can connect the digital camera to a computer system, meaning that the images can be saved in a hard disk. In such a manner, the images took by the digital camera can be displayed on a display device, or output by a printer immediately. Moreover, the user can also edit the saved images using an image editing tool to create images with special effects.

Figure 1:
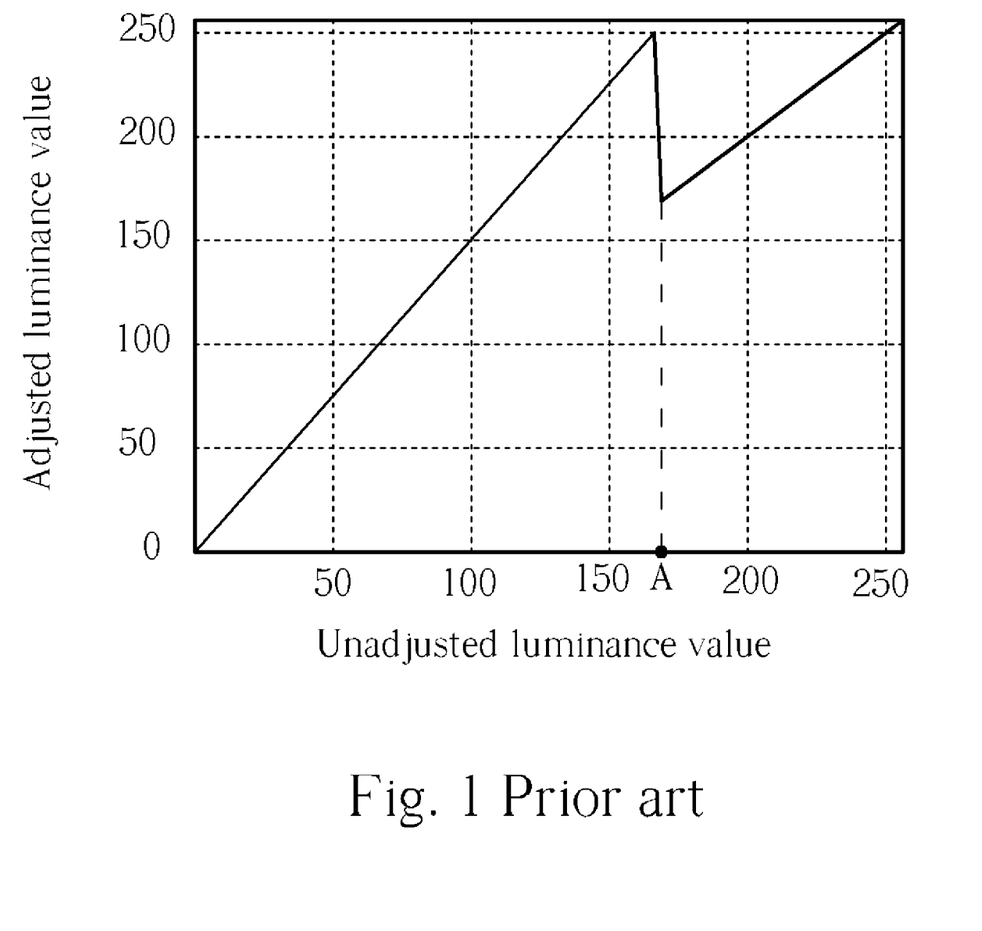
FIG. 1 is a γ correction curve of two-stage backlight image compensating method according to a prior art.

It is unavoidable for users to take photos of backlight image. Backlight image means an image having a dark object with a bright background. For improving this drawback, many methods for compensating a backlight image have been developed. The prior arts involve overcompensating the whole background based on the entire image, or compensating the backlight image in two stages through fuzzy technology. The methods mentioned above usually result injunction effect of the image. For example, please refer to FIG. 1. FIG. 1 is a γ correction curve of two-stage backlight image compensating method according to a prior art. The γ correction curve presents a corresponding relationship of brightness before and after being adjusted. The region that the unadjusted luminance value smaller than 'A' is the darker part of the backlight image. The two-stage compensating method according to the prior art involves only processing the darker part of the backlight image in a brightness-enhancement way. Therefore, there is a considerable discontinuity of color level at the border between two image-compensating stages (at the unadjusted luminance 'A'). That affects smoothness of the color level and then lowers the quality of the image. For solving this problem, another backlight image compensating method has been disclosed in the paper, "Detection and Compensation Algorithm for Backlight Images with Fuzzy Logic and Adaptive Compensation Curve", issued by C. L. Chin and C. T. Lin on International Journal of Pattern Recognition and Artificial Intelligence. However, the amount of calculations in the method is huge because of the extra compensation region detection. That will reduce the image processing efficiency. Therefore, how to develop a method to balance the image quality and calculation efficiency is the main subject of the present image processing technology.

SUMMARY OF THE INVENTION

It is therefore a primary objective of the claimed invention to provide a method for compensating a darker brightness of an image and a device thereof to solve the above-mentioned problem.

The claimed invention provides an image processing method comprising (a) inputting image data comprising a plurality of pixels; (b) setting a first luminance interval and a second luminance interval; (c) generating a first mean luminance value from a plurality of pixels of the image data within the first luminance interval; (d) generating a second mean luminance value from a plurality of pixels of the image data within the second luminance interval; (e) generating a first luminance threshold according to the first mean luminance value; (f) setting a compensation parameter; (g) generating a first compensation luminance value according to the first mean luminance value and the compensation parameter; (h) generating a second compensation luminance value according to the first luminance threshold, the first mean luminance value, the second mean luminance value and the compensation parameter; (i) obtaining a greater compensation luminance value according to a comparison between the first and second compensation luminance values; and (j) adjusting luminance values of image data between a smaller compensation luminance value and the greater compensation luminance value according to the smaller and greater compensation luminance values.

The claimed invention further provides an image processing system comprising an image inputting module for inputting an image data; a mean luminance value calculating device for generating a first mean luminance value according to a plurality of pixels within a first luminance interval of the image data, and generating a second mean luminance value according to a plurality of pixels within a second luminance interval of the image data; a compensation luminance value calculating device for generating a first compensation luminance value according to the first mean luminance value and a compensation parameter, and generating a second compensation luminance value according to a first luminance threshold, the first mean luminance value, the second mean luminance value, and the compensation parameter; a compensation luminance value comparing device for generating a greater compensation luminance value according to a comparison between the first and second compensation luminance values; and a processing device for adjusting luminance values of image data between a smaller compensation luminance value and the greater compensation luminance value according to the smaller and greater compensation luminance values.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
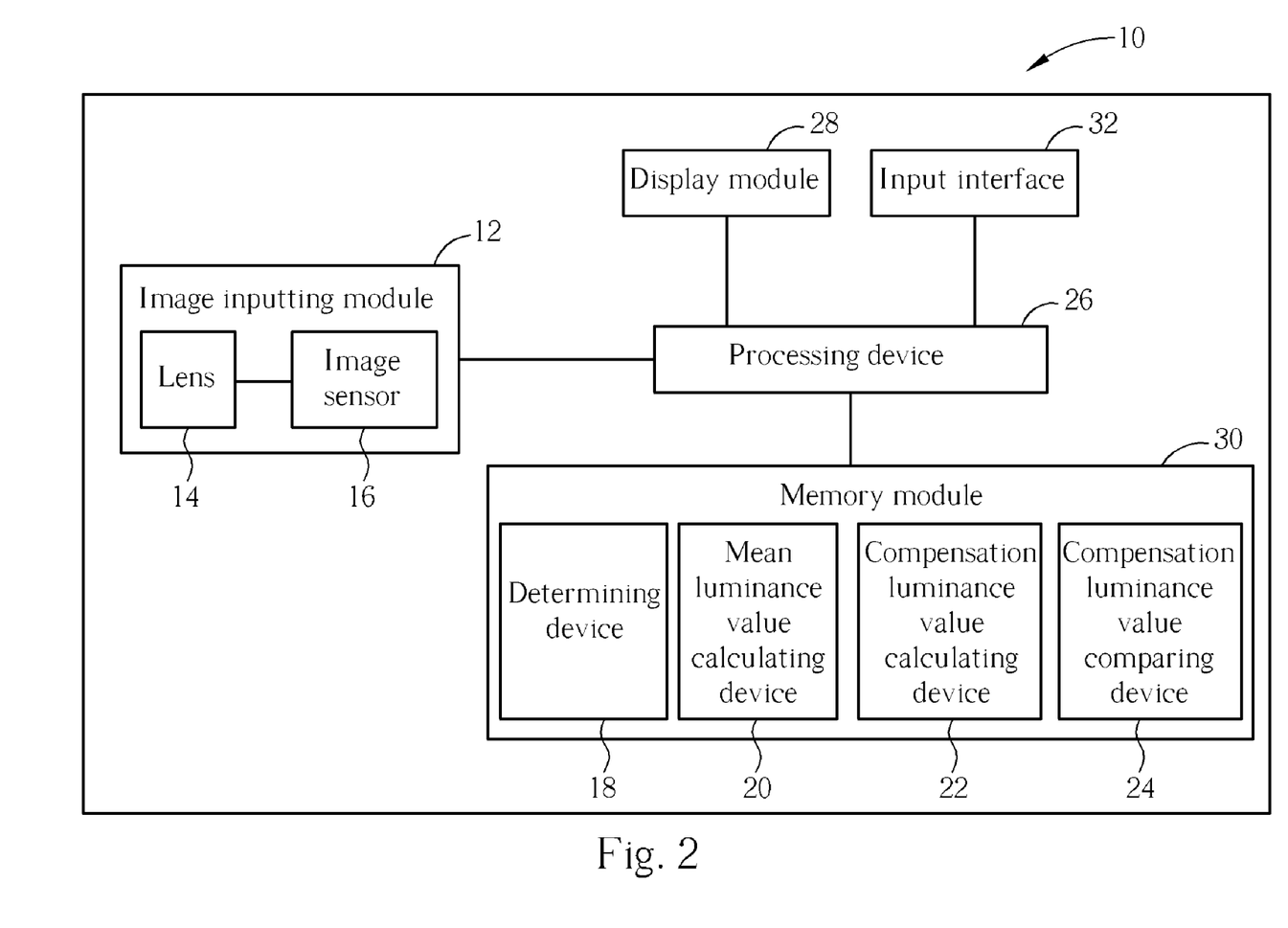
FIG. 2 is a functional block diagram of an image processing system according to an embodiment of the present invention.

Please refer to FIG. 2. FIG. 2 is a functional block diagram of an image processing system 10 according to an embodiment of the present invention. The image processing system 10 can be a digital camera, a mobile phone, or a computer system. The image processing system 10 comprises an image inputting module 12 for inputting an image data. The image inputting module 12 can be an image capturing module for taking images. The image inputting module 12 comprises a lens 14 for receiving light, and an image sensor 16 for transforming light received by the lens 14 into electrical signals to generate the image data. The image sensor 16 comprises a plurality of CCD (Charge Coupled Devices) image sensors or a plurality of CMOS (Complementary Metal-oxide Semiconductor) image sensors. The image processing system 10 further comprises a determining device 18, a mean luminance value calculating device 20, a compensation luminance value calculating device 22, a compensation luminance value comparing device 24, a processing device 26, a display module 28, and an input module 32. The determining device 18 is used for determining if the image data input by the image inputting module 12 is a backlight image. The mean luminance value calculating device 20 is used for generating a first mean luminance value $C_1$ according to a plurality of pixels within a first luminance interval, and generating a second mean luminance value $C_2$ according to a plurality of pixels within a second luminance interval. The compensation luminance value calculating device 22 is used for generating a first compensation luminance value $Y_1$ according to the first mean luminance value $C_1$ and a compensation parameter C, and generating a second compensation luminance value $Y_2$ according to a first luminance threshold $C_1+\sigma$, the first mean luminance value $C_1$, the second mean luminance value $C_2$ and the compensation parameter C. The compensation luminance value comparing device 24 is used for generating a greater compensation luminance value B through comparing the first compensation luminance value $Y_1$ with the second offset luminance $Y_2$. The processing device 26 is used for generating an adjusted luminance value between a smaller compensation luminance value b and the greater compensation luminance value B according to the smaller compensation luminance value b and the greater compensation luminance value B. The display module 28 is used for displaying the adjusted image data. If the determining device 18, the mean luminance value calculating device 20, the compensation luminance value calculating device 22, and the compensation luminance value comparing device 24 are program codes, the image processing system 10 can comprise a memory module 30 for saving the determining device 18, the mean luminance value calculating device 20, the compensation luminance value calculating device 22, and the compensation luminance value comparing device 24. The input module 32 is used for inputting data corresponding to the compensation parameter C, the first luminance threshold $C_1+\sigma$, the smaller luminance b, and so on.

Figure 3:
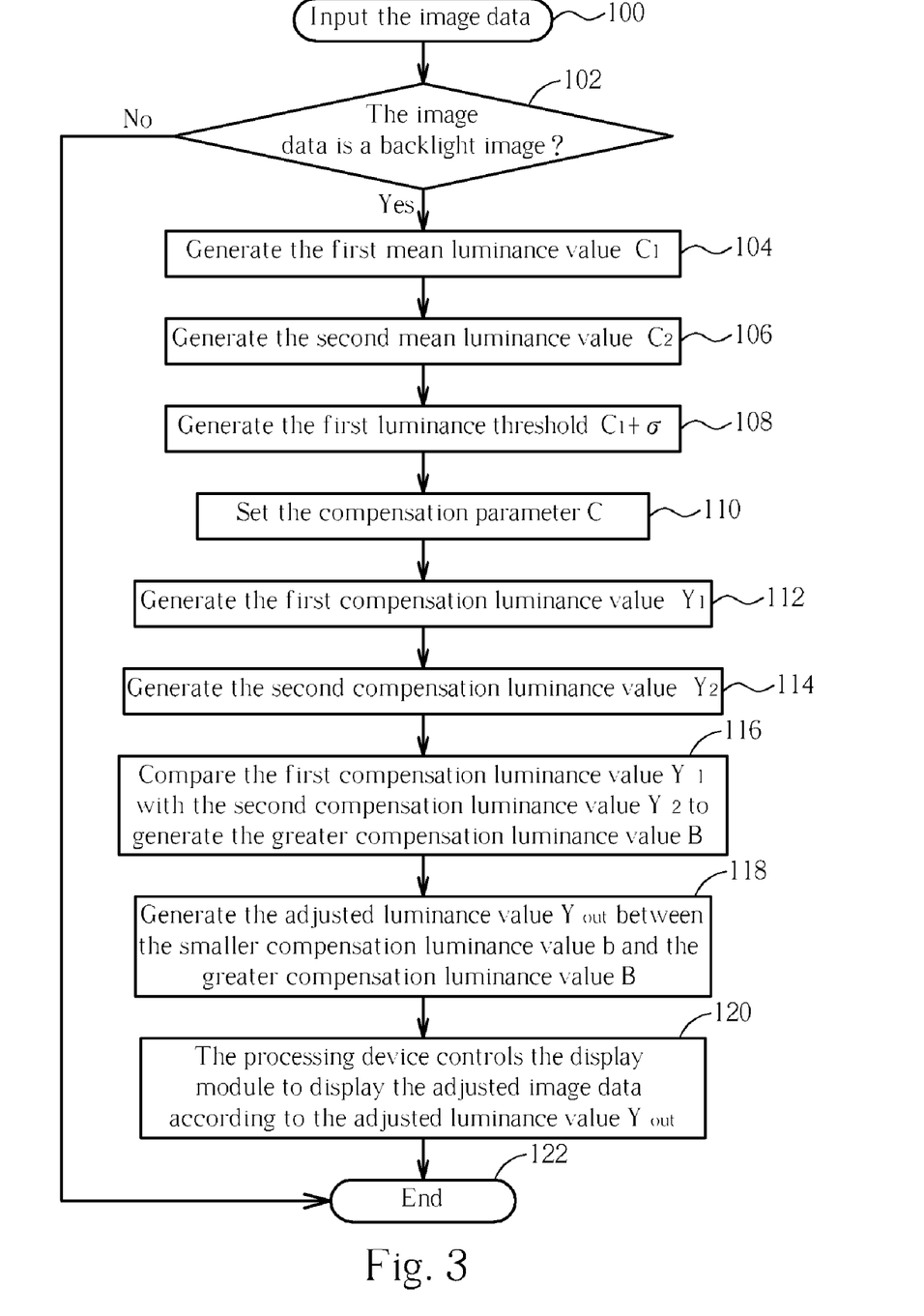
FIG. 3 is a flowchart of a method for processing the image data through the image processing system in FIG. 2.

Please refer to FIG. 3. FIG. 3 is a flowchart of a method for processing the image data through the image processing system 10 according to the embodiment of the present invention. The method comprises the following steps.

Step 100: The image inputting module 12 inputs the image data comprising a plurality of pixels;

Step 102: The determining device 18 determines if the image data input by the image inputting module 12 is a backlight image. If so, go to Step 104; if not, go to Step 122 to end the procedure. That is to say, the backlight image compensating procedure for the image data will not be executed.

Step 104: The mean luminance value calculating device 20 generates the first mean luminance value $C_1$ according to the plurality of pixels within the first luminance interval;

Step 106: The mean luminance value calculating device 20 generates the second mean luminance value $C_2$ according to the plurality of pixels within the second luminance interval;

Step 108: Generate the first luminance threshold $C_1+\sigma$ according to the first mean luminance value $C_1$;

Step 110: Set the compensation parameter C;

Step 112: The compensation luminance value calculating device 22 generates the first compensation luminance value $Y_1$ according to the first mean luminance value $C_1$ and the compensation parameter C;

Step 114: The compensation luminance value calculating device 22 generates the second compensation luminance value $Y_2$ according to the first luminance threshold $C_1+\sigma$, the first mean luminance value $C_1$, the second mean luminance value $C_2$, and the compensation parameter C;

Step 116: The compensation luminance value comparing device 24 generates a greater compensation luminance value B through comparing the first compensation luminance value $Y_1$ with the second compensation luminance value $Y_2$;

Step 118: The processing device 26 generates the adjusted luminance value $Y_{out}$ within the image data between the smaller compensation luminance value b and the greater compensation luminance value B according to a relation degree r(i), the unadjusted luminance value $Y_{in}$, b, and B;

Step 120: The processing device 26 controls the display module 28 to display the adjusted image data according to the adjusted luminance value $Y_{out}$ within the image data between the smaller compensation luminance value b and the greater compensation luminance value B;

Step 122: End.

Figure 4:
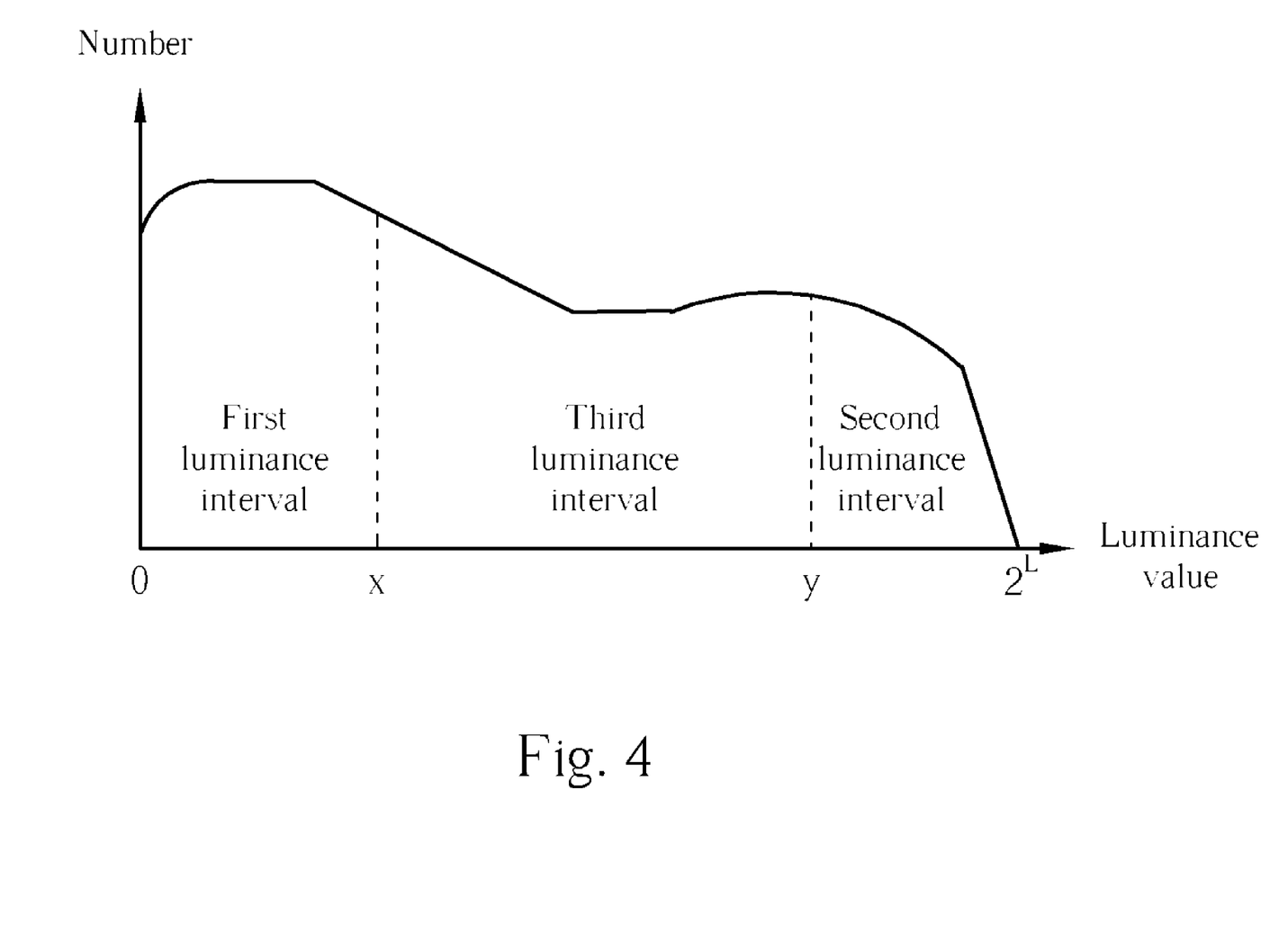
FIG. 4 is a histogram of the image data.

More detailed descriptions for the steps mentioned above will be provided. First, the image inputting module 12 is utilized to input image data, such as photos. Light emitted or reflected by the object can be received by the lens 14 and then be transformed into electrical signals by the image sensor 16 to generate image data. Next, the determining device 18 determines whether the image data input by the image inputting module 12 is a backlight image. If the determining device 18 determines the image data is a backlight image, the backlight image compensating procedure for the image data will be executed. If not, the backlight image compensating procedure for the image data will not be executed. That is to say, the image data will be output directly or be edited by other image algorithm without image processing. Many methods for determining if the image data input by the image inputting module 12 is a backlight image have already been disclosed in the prior art. For example, please refer to FIG. 4. FIG. 4 is a histogram of the image data. The histogram of the image data is generated according to the luminance values (such as gray level) of the plurality of pixels and the corresponding pixel points. The distribution of the histogram can be divided into three luminance intervals. The first luminance interval is a dark range. The second luminance interval is a light range. And the third luminance interval is a middle luminance interval. The boundary 'X' of the first luminance interval and the third luminance interval and the boundary 'Y' of the second luminance interval and the third luminance interval can be defined by a user. In general, when the luminance interval of the image data lies in between 0 and $2^L$ (L is a positive integer, such as 8), X can be equal to 25%~40% of $2^L$ and Y can be equal to 75%~85% of $2^L$. When the image data conforms to three conditions at the same time, the determining device 18 determines the image is a backlight image. The conditions are described as follows: (1) a ratio of the number of pixels within the first luminance interval to the number of pixels within the image data, and a ratio of the number of pixels within the second luminance interval to the number of pixels within the image data are greater than a specific ratio respectively, such as 3%; (2) a sum of the ratio of the number of pixels within the first luminance interval to the number of pixels within the image data and the ratio of the number of pixels within the second luminance interval to the number of pixels within the image data is greater than a specific ratio, such as 70%; (3) the number of pixels within the first luminance interval are not equal to the number of pixels within the second luminance interval. The aforementioned conditions are utilized to determine if the number difference of pixels between the light range and the dark range is too big. If so, the image data is determined as a backlight image. If not, the image data is not determined as a backlight image.

Next, the mean luminance value calculating device 20 generates the first mean luminance value $C_1$ according to the luminance value distribution of the plurality of pixels within the first luminance interval and generates the second mean luminance value $C_2$ according to the luminance value distribution of the plurality of pixels within the second luminance interval. The first mean luminance value $C_1$ is generated correspondingly according to half an accumulated number corresponding to luminance values within the first luminance interval. The accumulated number is accumulated from a number corresponding to the smallest luminance value to a number corresponding to the greatest luminance value within the first luminance interval. The first mean luminance value $C_1$ can also be generated through calculating a weighted average of the luminance values and the number corresponding to the luminance values within the first luminance interval. In a same manner, the second mean luminance value $C_2$ is generated through the said methods.

As for Step 108, the first luminance threshold $C_1+\sigma$ can be generated through a sum of a value $\sigma$ and the first mean luminance value $C_1$. The value $\sigma$ can be input by the user via the input module 32. The value $\sigma$ can also be generated when a ratio of the accumulated luminance within the range $[C_1-\sigma, C]$ to the accumulated luminance within the first luminance interval is equal to a specific ratio, such as 90%. Mostly, the value $\sigma$ is equal to $C_1$ because the first mean luminance value $C_1$ is very close to the origin (the smallest luminance value within the first luminance interval) and $C_1-\sigma$ cannot be a negative value.

Next, there are definitions for a relation degree r(i) and a compensation luminance value Y. The definition of the relation degree r(i) is described as follows wherein i is a luminance value:

$$r = \frac{d_2}{d_1+d_2} = \begin{cases} \frac{d_2}{d_1+d_2}, & \forall i \in [0, C_1-1] \\ \frac{d_2}{C_2-C_1} & \forall i \in [C_1, C_1+\sigma] \end{cases}$$

$$d_1=|C_1-i|, d_2=|C_2-i|$$

The definition of the compensation luminance value Y is described as follows wherein where C is the compensation parameter:

$$Y=i+r\times C, \forall i \in [0, C_1+\sigma], C \in [0, 2^L-1]$$

The value C can be input by the user through the input module 32 or can be the average of the first mean luminance value $C_1$ and the second mean luminance value $C_2$, wherein the greater the value C is, the larger the area of the compensation range is.

Next, the greatest value of the compensation luminance value Y within $i \in [0, C_1+\sigma]$ is needed to be an upper limit of the image compensation range. The greatest value of the compensation luminance value Y can be generated when i is equal to $C_1$ or $C_1+\sigma$. That will avoid unnecessary amount of the calculations. When i is equal to $C_1$, the first compensation luminance value $Y_1$ is generated by the following formula:

$$Y_1 = C_1 + C$$

When i is equal to $C_1+\sigma$, the second compensation luminance value $Y_2$ is generated by the following formula:

$$Y_2 = (C_1+\sigma) + \frac{C_2 - (C_1+\sigma)}{C_2 - C_1} \times C$$

In Step 112 and Step 114, the first compensation luminance value $Y_1$ and the second compensation luminance value $Y_2$ are generated respectively by the compensation luminance value calculating device 22. As mentioned above, because the greatest value of the compensation luminance value Y can be generated when i is equal to $C_1$ or $C_1+\sigma$, the compensation luminance value comparing device 24 in Step 116 compares the first compensation luminance value $Y_1$ with the second compensation luminance value $Y_2$ to generate a greater compensation luminance value B wherein the greater compensation luminance value B is a greater value between the first compensation luminance value $Y_1$ and the second compensation luminance value $Y_2$.

Next, the adjusted luminance $Y_{out}$ between the smaller compensation luminance value b (set by the user) and the greater compensation luminance value B can be generated through the following formula:

$$Y_{out} = B - \frac{(B-Y_{in})^\gamma}{(B-b)^{\gamma-1}}, \gamma \geq 1, Y_{in} \geq b$$

Figure 5:
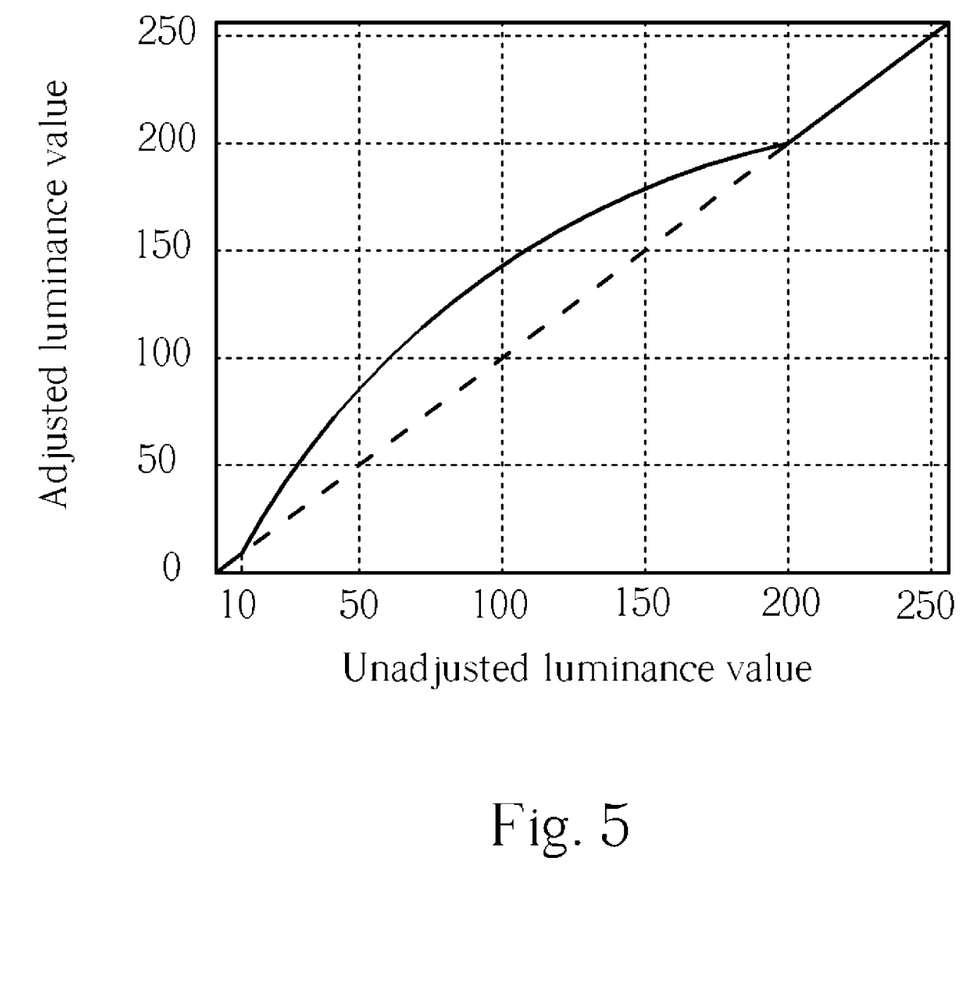
FIG. 5 is a γ correction curve given L=8 after the image data compensation processing is executed according to the embodiment of the present invention.

And the smaller compensation luminance value b and the value $\gamma$ can be input by the input module 32. The smaller compensation luminance value b is much smaller than the greater compensation luminance value B. For example, please refer to FIG. 5. FIG. 5 is a $\gamma$ correction curve given L=8 after the image data compensation processing is executed according to the embodiment of the present invention. The continuous line is the $\gamma$ correction curve after being compensated. The dashed line is the $\gamma$ correction curve before being compensated. When b is set for 10, $\gamma$ is set for 2, and the greater compensation luminance value B generated by the compensation luminance value comparing device 24 is equal to 200, the $\gamma$ correction curve as shown in FIG. 5 can be generated. As shown in FIG. 5, the range of the image data compensation is limited between the smaller compensation luminance value b and the greater compensation luminance value B. The image data greater than the greater compensation luminance value B is not adjusted (the slope of the $\gamma$ correction curve is equal to 1). The $\gamma$ correction curve after being compensated according to the present invention can avoid a color level discontinuity at the border between two image compensating stages (the greater compensation luminance value B) and can still keep the color level smoothness of the image. That will increase the quality of the image. Finally, the processing device 26 can control the display module 28 to display the adjusted image data according to the adjusted luminance $Y_{out}$ between the smaller compensation luminance value b and the greater compensation luminance value B.

Moreover, given fixed point implementation (gamma=2), there are only two division operations and 2(B−b)+1 multiplication operations in the backlight image compensating algorithm of the present invention. Compared with the prior art methods, the present invention can save the amount of calculations efficiently.

Compared with the prior art method, the image processing method and system thereof according the present invention can solve the discontinuity problem at the border between two image compensating stages and can still keep the color level smoothness and quality of the image. Furthermore, the algorithm according the present invention can save the amount of calculations efficiently. Therefore, the method of the present invention is a method to balance image quality and cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method comprising:
   (a) inputting image data comprising a plurality of pixels;
   (b) setting a first luminance interval and a second luminance interval;
   (c) generating a first mean luminance value from a plurality of pixels of the image data within the first luminance interval;
   (d) generating a second mean luminance value from a plurality of pixels of the image data within the second luminance interval;
   (e) generating a first luminance threshold according to the first mean luminance value;
   (f) setting a compensation parameter;
   (g) generating a first compensation luminance value according to the first mean luminance value and the compensation parameter;
   (h) generating a second compensation luminance value according to the first luminance threshold, the first mean luminance value, the second mean luminance value and the compensation parameter;
   (i) obtaining a greater compensation luminance value according to a comparison between the first and second compensation luminance values; and
   (j) adjusting luminance values of image data between a smaller compensation luminance value and the greater compensation luminance value according to the smaller and greater compensation luminance values.

2. The method of claim 1 further comprising checking if the image data is backlight image data.

3. The method of claim 2, wherein checking if the image data is backlight image data comprises determining the image data is backlight image data when a ratio of the number of pixels within the first luminance interval to the number of pixels within the image data, and a ratio of the number of pixels within the second luminance interval to the number of pixels within the image data are greater than a specific ratio respectively.

4. The method of claim 2, wherein checking if the image data is backlight image data comprises determining the image data is backlight image data when a sum of a ratio of the number of pixels within the first luminance interval to the number of pixels of the image data and a ratio of the number of pixels within the second luminance interval to the number of pixels within the image data is greater than a specific ratio.

5. The method of claim 1, wherein step (c) comprises generating the corresponding first mean luminance value according to half an accumulated number corresponding to luminance values within the first luminance interval, the accumulated number being accumulated from a number corresponding to the smallest luminance value to a number corresponding to the greatest luminance within the first luminance interval.

6. The method of claim 1, wherein step (c) comprises generating the first mean luminance value according to a weighted average of the luminance values and the number corresponding to the luminance values within the first luminance interval.

7. The method of claim 1, wherein step (d) comprises generating the corresponding second mean luminance value according to half an accumulated number corresponding to luminance values within the second luminance interval, the accumulated number being accumulated from a number corresponding to the smallest luminance value to a number corresponding to the greatest luminance within the second luminance interval.

8. The method of claim 1, wherein step (c) comprises generating the second mean luminance value according to a weighted average of the luminance values and the number corresponding to the luminance values within the second luminance interval.

9. The method of claim 1, wherein the first compensation luminance value in step (g) is a sum of the first mean luminance value and the compensation parameter.

10. The method of claim 1, wherein step (f) comprises generating the compensation parameter according to the first mean luminance value and the second mean luminance value.

11. The method of claim 10, wherein the compensation parameter is (the first mean luminance value+the second mean luminance value)/(a positive integer).

12. The method of claim 10, wherein the positive integer is 2.

13. The method of claim 1, wherein the second compensation luminance value in step (h) is (the first luminance threshold)+|the second mean luminance value−the first luminance threshold|/(the second luminance threshold−the first mean luminance value)*(the compensation parameter).

14. The method of claim 13, wherein the compensation parameter is (the first mean luminance value+the second mean luminance value)/2.

15. The method of claim 1, wherein the greater compensation luminance value is a greater value between the first compensation luminance value and the second compensation luminance value.

16. The method of claim 1 further comprising providing a value γ, and generating the adjusted luminance in step (j) through a following equation:

the adjusted luminance value=the greater compensation luminance value−(the greater compensation luminance value−the unadjusted luminance value)$^γ$/(the greater compensation luminance value−the smaller compensation luminance value)$^{(γ-1)}$.

17. The method of claim 16, wherein the value γ is greater than 1.

18. The method of claim 1 further comprising not adjusting the luminance values of image data outside the range between the smaller and the greater compensation luminance values.

19. An image processing system comprising:
   an image inputting module for inputting image data;
   a mean luminance value calculating device for generating a first mean luminance value according to a plurality of pixels within a first luminance interval of the image data, and generating a second mean luminance value according to a plurality of pixels within a second luminance interval of the image data;
   a compensation luminance value calculating device for generating a first compensation luminance value according to the first mean luminance value and a compensation parameter, and generating a second compensation luminance value according to a first luminance threshold, the first mean luminance value, the second mean luminance value, and the compensation parameter;

a compensation luminance value comparing device for generating a greater compensation luminance value according to a comparison between the first and second compensation luminance values; and a processing device for adjusting luminance values of image data between a smaller compensation luminance value and the greater compensation luminance value according to the smaller and greater compensation luminance values.

20. The image processing system of claim 19 further comprising a determining device for determining if the image data is a backlight image.

* * * * *